United States Patent
Heitplatz et al.

(10) Patent No.: US 9,604,797 B2
(45) Date of Patent: Mar. 28, 2017

(54) APPARATUS AND PROCESS FOR UNLOADING LOAD ITEMS FROM A LOADING SPACE

(71) Applicant: BEUMER GmbH & Co. KG, Beckum (DE)

(72) Inventors: Heino Heitplatz, Drensteinfurt (DE); Ludger Pölling, Wadersloh (DE); Thomas Wiesmann, Beckum (DE); Philipp Schäfer, Salzkotten (DE)

(73) Assignee: BEUMER GMBH & CO. KG, Beckum (DE)

( * ) Notice: Subject to any disclaimer, the term of this patent is extended or adjusted under 35 U.S.C. 154(b) by 0 days.

(21) Appl. No.: 14/005,183

(22) PCT Filed: Jan. 18, 2013

(86) PCT No.: PCT/DE2013/000035
§ 371 (c)(1),
(2) Date: Sep. 13, 2013

(87) PCT Pub. No.: WO2013/117177
PCT Pub. Date: Aug. 15, 2013

(65) Prior Publication Data
US 2014/0348625 A1    Nov. 27, 2014

(30) Foreign Application Priority Data
Feb. 9, 2012  (DE) .................. 10 2012 003 439

(51) Int. Cl.
*B65G 59/00*  (2006.01)
*B65G 67/24*  (2006.01)
*B65G 67/08*  (2006.01)

(52) U.S. Cl.
CPC ............ *B65G 67/24* (2013.01); *B65G 67/08* (2013.01); *B65G 2814/0308* (2013.01)

(58) Field of Classification Search
CPC .............. B65G 7/08; B65G 2814/0308; B65G 2814/031; B65G 59/02; B65G 67/02;
(Continued)

(56) References Cited

U.S. PATENT DOCUMENTS 3,826,353 A * 7/1974 Greasley ............... B65G 15/26
                                                           198/302
3,827,585 A   8/1974 McWilliams
(Continued)

FOREIGN PATENT DOCUMENTS

| AT | 504128 B1 | 3/2008 |
| DE | 000010255843 B4 | 6/2004 |

(Continued)

*Primary Examiner* — Michael McCullough
*Assistant Examiner* — Lynn Schwenning
(74) *Attorney, Agent, or Firm* — Ganz Pollard LLC

(57) ABSTRACT

An apparatus for unloading load items, comprising a receiving conveyor having a freely projecting receiving end and a rear delivery end, a removal conveyor and a transfer conveyor arranged therebetween which has a front takeover end adjoining the delivery end of the receiving conveyor and a rear handover end adjoining a head end of the removal conveyor, wherein the transfer conveyor is mounted so as to be pivotable in height about a first swivelling axis arranged at the handover end, and the receiving conveyor is mounted so as to be pivotable in height about a second swivelling axis arranged at the delivery end, wherein the receiving conveyor and the transfer conveyor can be moved, by being swivelled about the first and second swivelling axes, into at least one upper unloading position, in which the transfer conveyor is substantially horizontal before the first swivelling axis, the receiving conveyor is substantially vertical below the second swivelling axis and the receiving end of the receiving conveyor is on the floor of the loading space, or into at least one lower unloading position, in which the receiving conveyor and the transfer conveyor are at an angle of no more (Continued)

Figure 1:
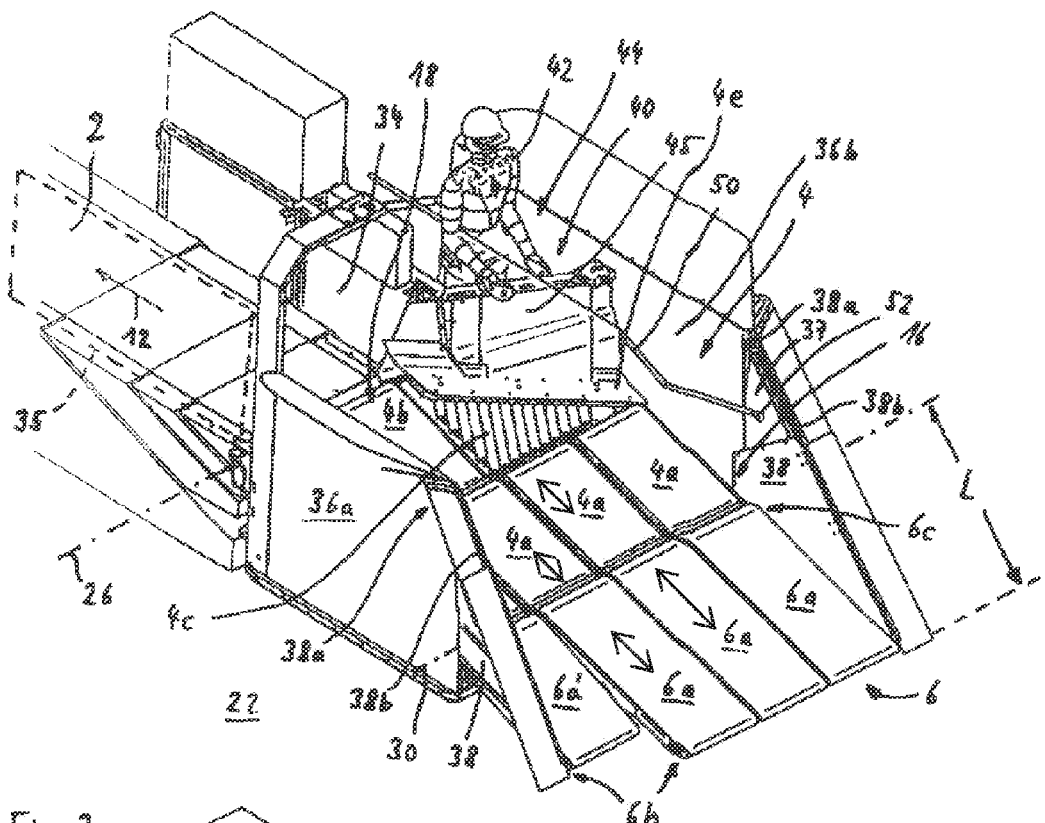

than 10°, 20°, 30° or 40° to the horizontal and the receiving end of the receiving conveyor is located on the floor of the loading space, and unloading processes using the apparatus.

18 Claims, 7 Drawing Sheets

(58) Field of Classification Search
CPC ...... B65G 47/647; B65G 21/12; B65G 67/30; B65G 7/24; B65G 7/26; B65G 7/28; B65G 7/32
USPC ......... 414/795.4, 796.9, 797.6, 796.3, 796.4, 414/796.5; 198/300, 314, 312, 317, 588, 198/589
See application file for complete search history.

(56) References Cited

U.S. PATENT DOCUMENTS

| | | | | |
|---|---|---|---|---|
| 3,836,021 A | * | 9/1974 | McWilliams | B65G 67/08 198/524 |
| 3,854,610 A | * | 12/1974 | Carder | B60P 1/36 198/300 |
| 4,149,640 A | * | 4/1979 | White | A01G 1/004 111/100 |
| 4,279,555 A | | 7/1981 | Rydell | |
| 4,281,955 A | * | 8/1981 | McWilliams | B65G 21/14 198/303 |
| 4,765,461 A | * | 8/1988 | Ozolins | B65G 21/14 198/311 |
| 4,795,297 A | * | 1/1989 | Tokuno | B65H 1/30 271/151 |
| 5,256,021 A | * | 10/1993 | Wolf | B65G 67/08 198/308.1 |
| 5,462,400 A | * | 10/1995 | Bonnet | B65G 59/023 198/785 |
| 6,006,893 A | * | 12/1999 | Gilmore | B65G 67/08 198/588 |
| 7,641,040 B2 | * | 1/2010 | Harris | B65G 47/1471 198/396 |
| 2002/0092728 A1 | * | 7/2002 | Tanaka | B65G 1/137 198/301 |
| 2004/0033126 A1 | * | 2/2004 | Thogersen | B64F 1/32 414/398 |
| 2009/0074546 A1 | * | 3/2009 | Christensen | B64F 1/32 414/298 |
| 2011/0076115 A1 | * | 3/2011 | Page | D06F 5/00 414/13 |
| 2012/0087770 A1 | * | 4/2012 | Pippin | B65G 67/24 414/795.4 |
| 2012/0097498 A1 | * | 4/2012 | Campbell | B65G 13/12 198/317 |

FOREIGN PATENT DOCUMENTS

| | | |
|---|---|---|
| DE | 102010015299 A1 | 10/2011 |
| WO | 2006/117003 | 11/2006 |

* cited by examiner

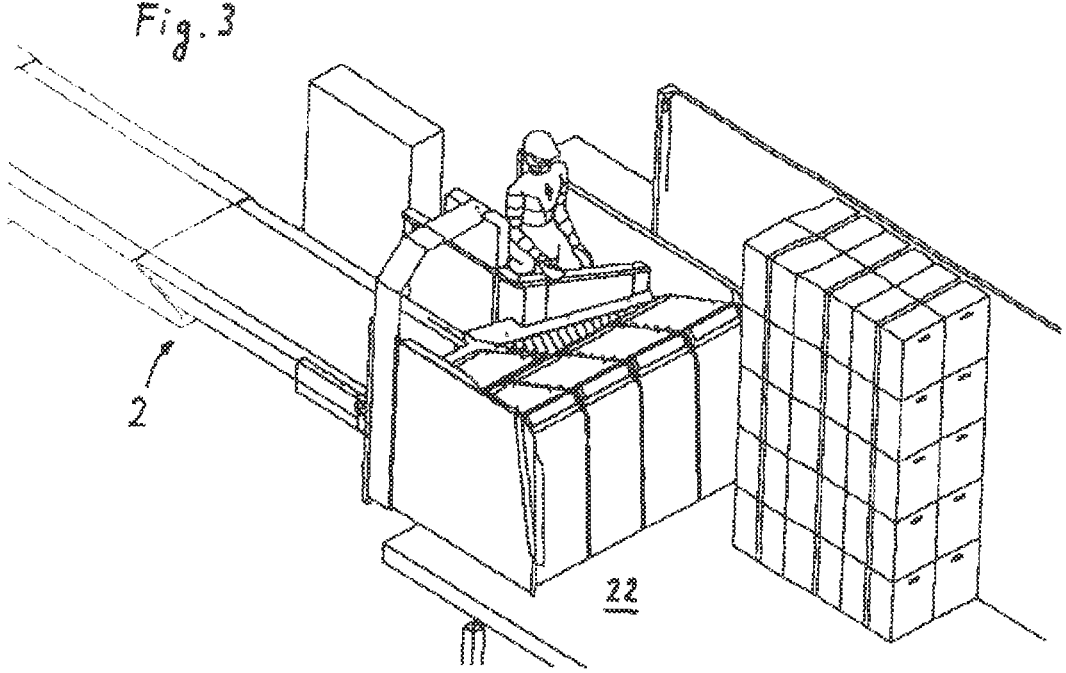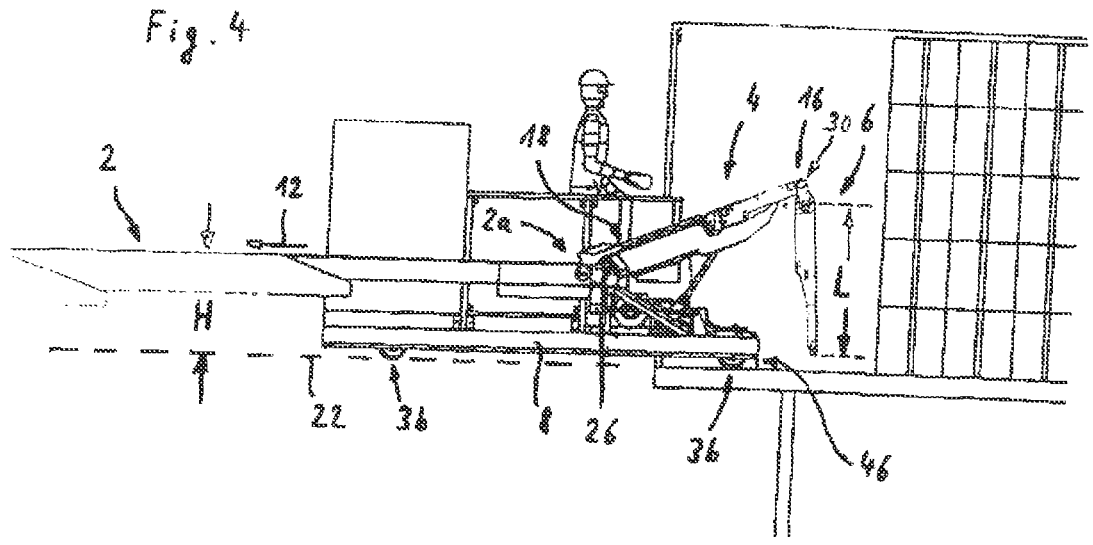

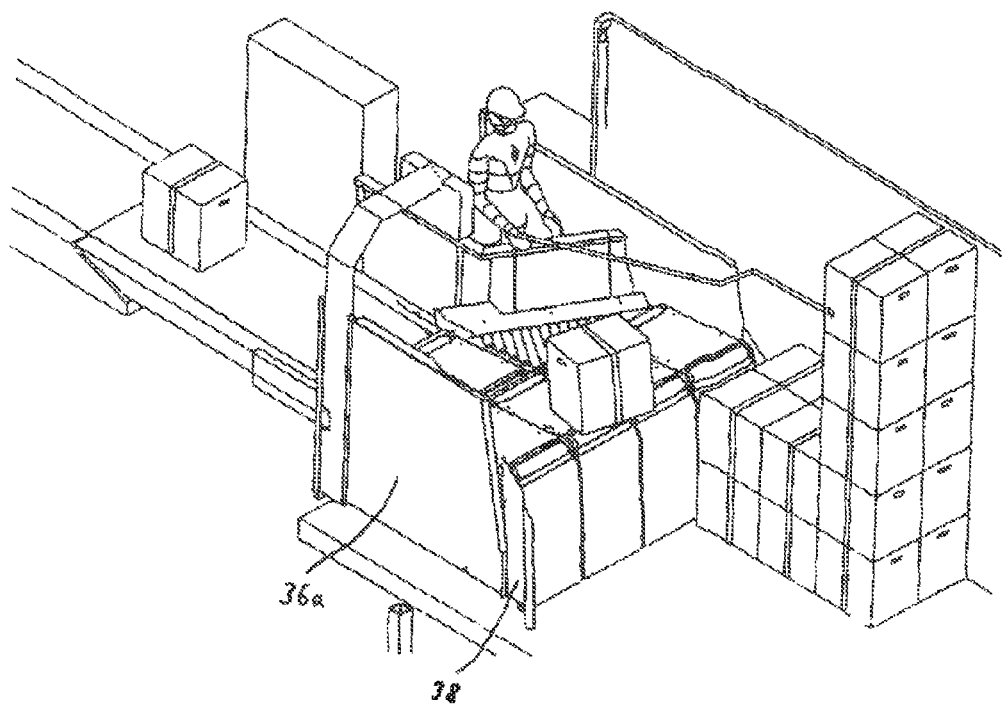
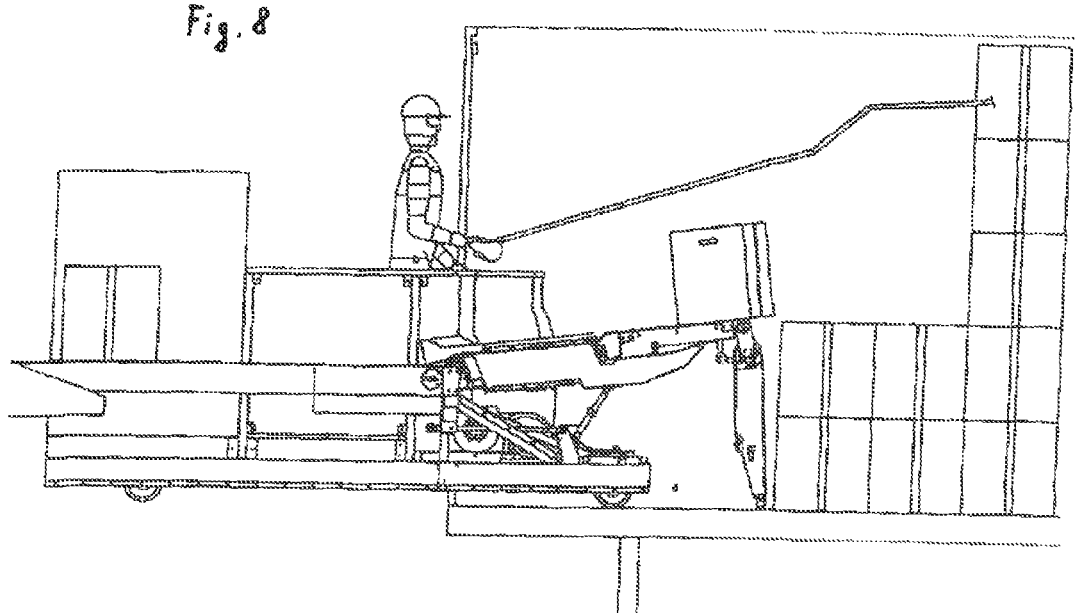

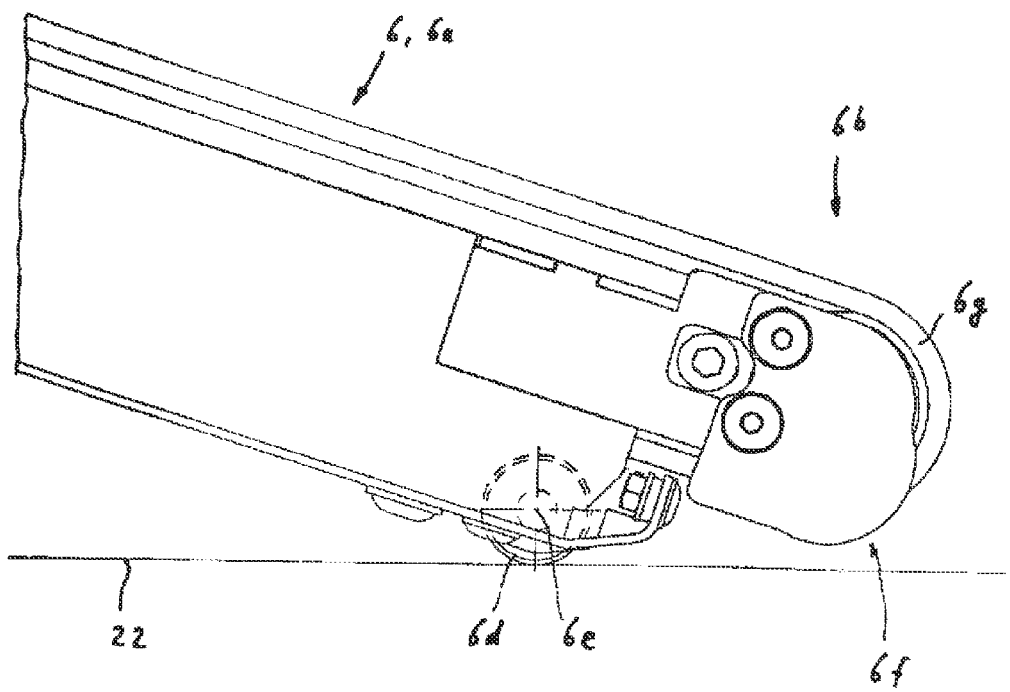
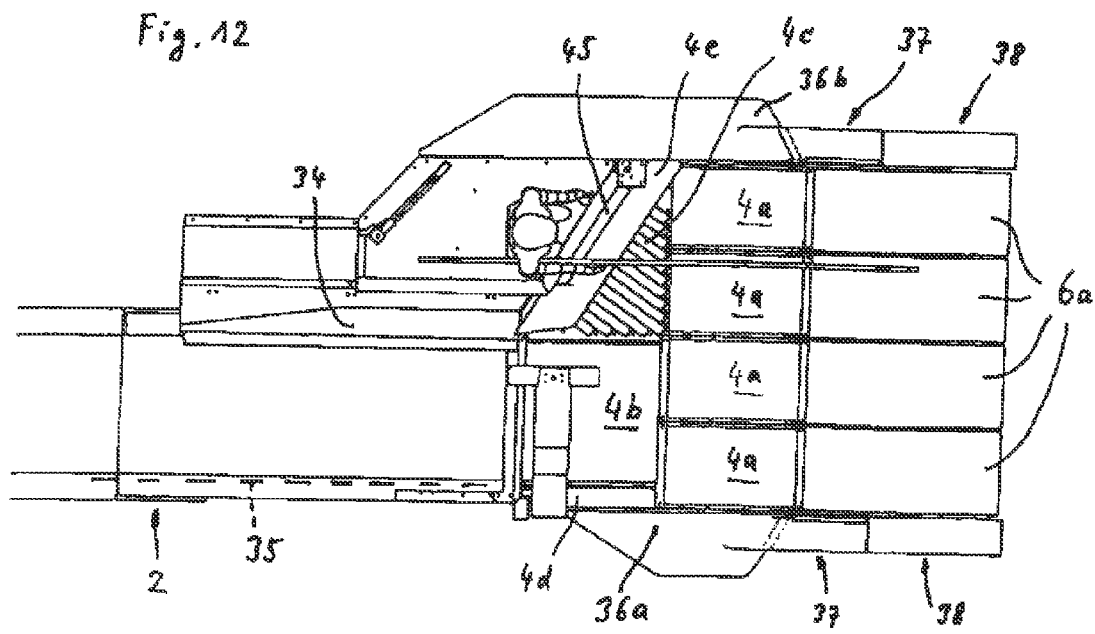

APPARATUS AND PROCESS FOR UNLOADING LOAD ITEMS FROM A LOADING SPACE

The invention relates to an apparatus for unloading load items stacked, tipped or loosely piled on a floor of a loading space, such as parcels, cardboard boxes, crates and similar packed items, comprising a receiving conveyor having a freely projecting receiving end and a rear delivery end, a removal conveyor and a transfer conveyor arranged therebetween which has a front takeover end adjoining the delivery end of the receiving conveyor and a rear handover end adjoining a head end of the removal conveyor, wherein the transfer conveyor is mounted so as to be pivotable in height about a first swivelling axis arranged transversely to its conveying direction at the handover end and adjacent to the head end of the removal conveyor, and the receiving conveyor is mounted so as to be pivotable in height about a second swivelling axis arranged transversely to its conveying direction at the delivery end and adjacent to the takeover end of the transfer conveyor.

The invention further relates to a process for unloading load items stacked, tipped or loosely piled on a floor of a loading space, using such an apparatus.

An apparatus and a process of the type mentioned are used in particular for unloading load items in the manner of bulk material from loading spaces of vehicles, also in the form of swap bodies or swap body tank containers, the latter being replaceable freight carriers, which can be transported by a carrier vehicle (lorry) and separated from it.

The object of the invention is thus not the individualised unloading of items, where each item is picked and handled individually, but rather unloading preferably in the manner of bulk material, where a high throughput of, for example, at least 3,000 items/hour is desired.

DE 10 2010 015 299 A1 discloses a system for handling load items for preferably automatically loading and unloading a loading space in which the load items are stacked one on top of the other; in that system, a number of conveyor belts arranged one behind the other in series are provided, some of which are mounted so as to be pivotable and adjustable in height and enable the transfer of load items directly from a position where the respective load item is stored at a particular height to a receiving conveyor, from where the load items are delivered to a removal conveyor via a transfer conveyor. The receiving conveyor is always aligned substantially horizontally at different heights in order to receive load items.

If they are load items of a substantially uniform size which are stacked in an orderly manner, it is possible to work advangtageously with such a system. Problems do, however, occur whenever individual load items have distinctly uneven dimensions and/or are stacked irregularly, because then it frequently happens that individual load items fall down next to the receiving conveyor onto the floor of the loading space or onto other load items. Quite apart from the fact that the load items are in danger of being damaged as a result of falling down, there is a risk that load items might be trapped when the receiving conveyor is powered down. In addition, there is the difficulty of using the receiving conveyor to pick up load items in a suitable way when they have fallen down in an uncontrolled manner and are lying around on the floor in disarray.

The problem on which the invention problem is based is to propose an improved apparatus and an improved process for unloading load items stacked on a floor of a loading space, in which the above-mentioned problems are at least partially solved.

In an apparatus of the generic kind, this problem is solved by the following measures: the receiving conveyor and the transfer conveyor can be moved, by being swivelled about the first and/or second swivelling axes, into at least one upper unloading position, in which one conveying surface of the transfer conveyor is predominantly horizontal, i.e. at an angle of no more than 10°, 20°, 30° or 40° to the horizontal, before the first swivelling axis; one conveying surface of the receiving conveyor is predominantly vertical, i.e. at an angle of no more than 10°, 20°, 30° or 40° to the vertical, below the second swivelling axis; and the receiving end of the receiving conveyor is on or directly above the floor of the loading space; or the transfer conveyor can be moved into at least one lower unloading position, in which the conveying surfaces of the receiving conveyor and the transfer conveyor are predominantly horizontal, i.e. at an angle of no more than 10°, 20°, 30° or 40° to the horizontal, before the second swivelling axis, and the receiving end of the receiving conveyor is located on or directly above the floor of the loading space.

In a preferred or first upper unloading position, the conveying surface of the receiving conveyor is inclined by no more than 10° to the vertical, and is in particular in a vertical position beneath the takeover end of the transfer conveyor, and the conveying surface of the transfer conveyor is inclined by less than 20° to 40°, preferably 25° to 35° to the horizontal, dropping in the conveying direction. In a preferred second upper or middle unloading position, the receiving conveyor adopts a position as in the preferred upper unloading position, while the conveying surface of the transfer conveyor is disposed in a range between 10° to the horizontal, rising in the conveying direction, and preferably between 5° and 15°, dropping in the conveying direction.

In a preferred lower unloading position, the transfer and receiving conveyors are inclined at the same angles, rising in the conveying direction, especially at 10° to 30°, and abut each other continuously. This forms a continuous first conveying surface, which is substantially flat.

In an upper or the preferred upper unloading position, there is the advantage that the receiving conveyor forms a delimitation of the takeover end of the transfer conveyor towards the floor, so that any load items that might possible fall down in an uncontrolled way can under no circumstances enter an area beneath the transfer conveyor, i.e. between the floor of the loading space and the transfer conveyor, whereas in the lower unloading position any load item lying on the floor in an orderly or disorderly way can be picked up relatively unproblematically.

It is convenient for there to be, in addition to the conveyor drives for the conveyors, drives for the swivelling movement at least of the transfer conveyor, and optionally also of the receiving conveyor, for example an hydraulic drive, a servomotor or a stepping motor with transmissions for the transfer and optionally also the receiving conveyor. The receiving conveyor may be suspended from the transfer conveyor so as to be capable of swivelling freely, so that in the lower unloading position it adopts a steeper position or its vertical position solely as a result of the fact that the transfer conveyor is swivelled up towards an upper unloading position. Conversely, in this case, the receiving conveyor adopts an increasingly flatter position, proceeding from a vertical position, for instance by swivelling down the takeover conveyor, since the receiving end is resting on the floor or on a roller a small distance from the floor.

The removal conveyor can be disposed at a predetermined height above the floor, especially in a horizontal orientation, wherein the predetermined height may be about one length to half a length of the receiving conveyor. The transfer conveyor and the removal conveyor may be arranged horizontally in an upper unloading position or sloping downwards in the conveying direction and abut each other continuously. This forms a continuous second conveying surface. All together, since the receiving, transfer and removal conveyors each abut each other continuously, the first and second conveying surfaces form a continuous conveying surface.

The free receiving end of the receiving conveyor, which faces away from the removal conveyor, may have a width which is 1.5 to 3 times a width of the removal conveyor, and in particular a width of 2 to 3 m, in order to be able to unload transport receptacles such as containers. The receiving conveyor preferably has a constant width over its length, whereas the transfer conveyor has a width which reduces gradually between its receiving and handover ends, with no sharp transitions, down to the width of the removal conveyor.

It is preferably contemplated that the receiving conveyor can be telescoped or passively adjusted in length. In the case of an embodiment which can be telescoped, the receiving conveyor can be actively and infinitely changed in length in both directions. In the case of an embodiment in which the length can be adjusted passively, there is an initial length in an unloaded state, where the length of the receiving conveyor can be shortened under the effect of a force acting on the receiving end in its conveying direction against a restoring force exerted by a restoring spring and returns to the initial length when the force ceases to act. The variable length of the receiving conveyor allows a certain flexibility with regard to the height above the floor at which the removal conveyor and the transfer conveyor may be disposed when aligned horizontally. The shortest possible length of the receiving conveyor may, for example, be no more than 90%, 80%, 70%, 60% or 50% of an initial length in the unshortened state. The receiving conveyor may be equipped with a safety cut-off, which switches off the conveyor drive of the receiving conveyor if it falls short of a predetermined length, such as when the shortest possible length is reached, and/or if a predetermined force acting on the receiving end in the conveying direction is exceeded. The safety cut-off may also be adapted such that it switches off a downward swivelling movement of the transfer conveyor as soon as less than the predetermined length of the receiving conveyor is reached and/or a predetermined force acting on the receiving end in the conveying direction force is exceeded.

In the lower unloading position, a receiving conveyor which is adjustable in length against the restoring force of a spring can be pressed gently against the load item lying on the floor, without damaging it. If the pressing force exceeds a predetermined value, the receiving conveyor yields, shortening its length. In this way, compensation for the amount of travel is achieved for the travelling unit.

The invention conveniently contemplates that the removal conveyor can be telescoped, as a result of which, if the removal conveyor is extended, its head end and the first swivelling axis are displaced opposite to the conveying direction, and the transfer and receiving conveyors can, for example, be moved into a loading space.

The removal conveyor can be telescoped in or against its conveying direction by means of a travelling unit which can be moved on the ground, such as the floor of the loading space. Although it is in principle possible for the removal conveyor, the transfer conveyor and the receiving conveyor to be units that can be moved separately, it is convenient for the removal conveyor and the transfer conveyor to be disposed on a common travelling unit which can be moved as a whole. The travelling unit can preferably be moved forwards, backwards or diagonally forwards/backwards without changing its orientation, i.e. without rotating about its own vertical axis.

The travelling unit may possess drivable and steerable rollers with which a desired travelling movement can be executed. It is convenient for three steerable rollers to be disposed at the corners of an isosceles or non-isosceles triangle, the steering positions or steering directions of which are identical and which are synchronised by means of a motor-driven belt or chain drive.

The travelling unit preferably has lateral distance sensors, such as in the form of ultrasonic or optical sensors, in order to detect a lateral distance on each side from a wall or the like. Per side, it is possible to provide two or more distance sensors arranged spaced apart horizontally from one another. In addition, two laser pointers may be provided pointing forwards in the longitudinal direction as an entry and steering aid.

At a front end of the travelling unit, near the floor, it is possible to provide a light barrier disposed transversely, with which articles such as load items can be detected which cannot be seen by the operator and which might damage the travelling unit as it passes. At the front end and preferably also on both sides of the travelling unit there is a deflector brush or strip which extends as far as or almost as far as the floor, in order to prevent the unit from travelling over any load items that might have been overlooked.

The travelling unit may be connected to the removal conveyor by means of two parallel coupling rods in order to allow a certain tolerance between their respective positions.

It may be contemplated that the transfer conveyor is wider at the takeover end than at the handover end and is equipped with at least one lateral conveyor member which is in particular rectangular, triangular or trapezoidal and tapers towards the handover end. Alternatively, the transfer conveyor may possess a triangular or trapezoidal roller path, the rollers of which are divided along a longitudinal central line and are adjusted to converge in a slight V-shape in order to create a conveying component towards the middle. It is convenient for the receiving conveyor to be just as wide as the transfer conveyor at its takeover end, and the transfer conveyor is preferably just as wide at its handover end as the removal conveyor at its head end.

The receiving conveyor may have a plurality of receiving conveying members arranged parallel, side by side, which can be driven and reversed independently of one another, also at different speeds, and can be telescoped or adjusted passively in length. The transfer conveyor may have a plurality of transfer conveying members arranged parallel, side by side, which can be driven and reversed independently of one another, also at different speeds. The receiving and/or transfer conveyor may be configured so as to be shock-absorbing in order to lessen the shocks of any load items that might fall down and to handle them gently, such as by means of shock-absorbing conveyor belts, for example consisting of or coated with elastic material, or by means of sprung-mounted rollers in the case of a roller conveyor.

It may be contemplated that fixed and/or movable side walls are disposed on one or both sides adjacent to the removal conveyor and/or on one or both sides adjacent to the transfer conveyor and/or on one or both sides adjacent to the receiving conveyor, wherein the side walls may be vertical or may slope diagonally outwards, in order to prevent load items from falling off the transfer conveyor or the removal conveyor.

A working platform for an operator may be provided to the left and/or right, seen in the conveying direction, adjacent to the transfer conveyor and/or the removal conveyor, and in particular outside and adjacent to a side wall. The operator can control the movements and conveying speeds of the travelling unit, removal conveyor, transfer conveyor and receiving conveyor manually or may operate a control system which is already installed, and with which the drives for the conveyors and the swivelling movements about the first and second swivelling axes and the travelling unit can be controlled, so that the apparatus can be moved into a desired unloading position or receiving position and then moved as needed. In particular, it is possible to program or store a number of different upper and/or lower unloading positions in the control system, so that a suitable unloading position can be selected as required, in which the receiving conveyor and the transfer conveyor each adopt a predetermined inclination and, if necessary, are moved to a desired position by moving the apparatus, such as by being driven a greater or lesser distance into or out of the loading space.

In the case of an operator working right-handedly, it is convenient to arrange the working platform to the left of the removal conveyor, seen in the direction of the receiving conveyor, since a manipulation device or auxiliary tool held by the operator in his right hand, such as a rod, lance, grip or hook, is then closer to the middle of the conveyors than if it is arranged to the right of the removal conveyor.

The invention further relates to a process for unloading load items stacked on a floor of a loading space using an apparatus in accordance with the invention, wherein in a first step, the apparatus is moved to an upper unloading position, and a load item located above a predetermined unloading height or above the transfer conveyor, is transferred to the transfer conveyor, and in a second step, the apparatus is moved to a lower unloading position, and a load item located below the predetermined unloading height or on the floor of the loading space is transferred to the receiving conveyor. Load items located above a predetermined unloading height are preferably placed on the transfer conveyor with manual assistance from an operator, who moves the load items onto the transfer conveyor with an auxiliary tool, such as a rod with a gripping tool attached. Load items from the floor are preferably picked up and placed on the receiving conveyor solely by means of the drive of the receiving conveyor, in combination with a gentle forward movement of the travelling unit towards the load items to be picked up, optionally assisted by the operator.

During the first step, various upper unloading positions are possible, preferably a first upper unloading position, in which the takeover end is at a first height, such as at the greatest possible height above the floor with the receiving end still touching the floor, or slightly higher, such as 5 mm to 2 cm above it, while the receiving conveyor adopts a vertical position and its initial length is not shortened, and a second upper or middle unloading position, in which the takeover end is at a second height, which is lower than the first height, such as at the lowest possible height above the floor, in which the receiving conveyor is shortened as far as possible and adopts a vertical position. Between these extreme positions, any intermediate positions can be adopted.

Before or during the first step, the apparatus is preferably advanced as far as possible into the loading space opposite the conveying direction or towards the load items to be picked up, until the receiving conveyor, which is preferably in a vertical position, comes to rest against load items so that, as far as possible, any load items falling or down pulled down from above fall directly onto the transfer conveyor and not onto the floor in front of the receiving conveyor. Before or during the second step, the apparatus can be moved into a number of successive lower unloading positions, in particular into the preferred lower unloading position, wherein the receiving conveyor, proceeding from its vertical position, is moved into the upper unloading position, in one or more steps or infinitely, towards a sloping or substantially horizontal position, while the receiving end is located on or directly above the floor. During or before the second step, the apparatus can be moved further forward into the loading space or towards the load items to be unloaded, such as while, before or after the apparatus has been moved into a different upper unloading position.

The first and second steps may be repeated alternately if required, until the loading space has been completely unloaded. Any load items lying on the floor of the loading space can be picked up by moving the apparatus towards the load items concerned, or contrary to the conveying direction, with the apparatus in the lower unloading position.

One advantage of the invention is that the operator has to perform virtually no lifting work during the unloading, because the load items to be unloaded and picked up by the apparatus merely have to be pulled down from their stacked position or pulled from a lying position at least partially onto the receiving conveyor. A further aspect is that the operator is well-protected against any load items that might fall down.

Figure 2:
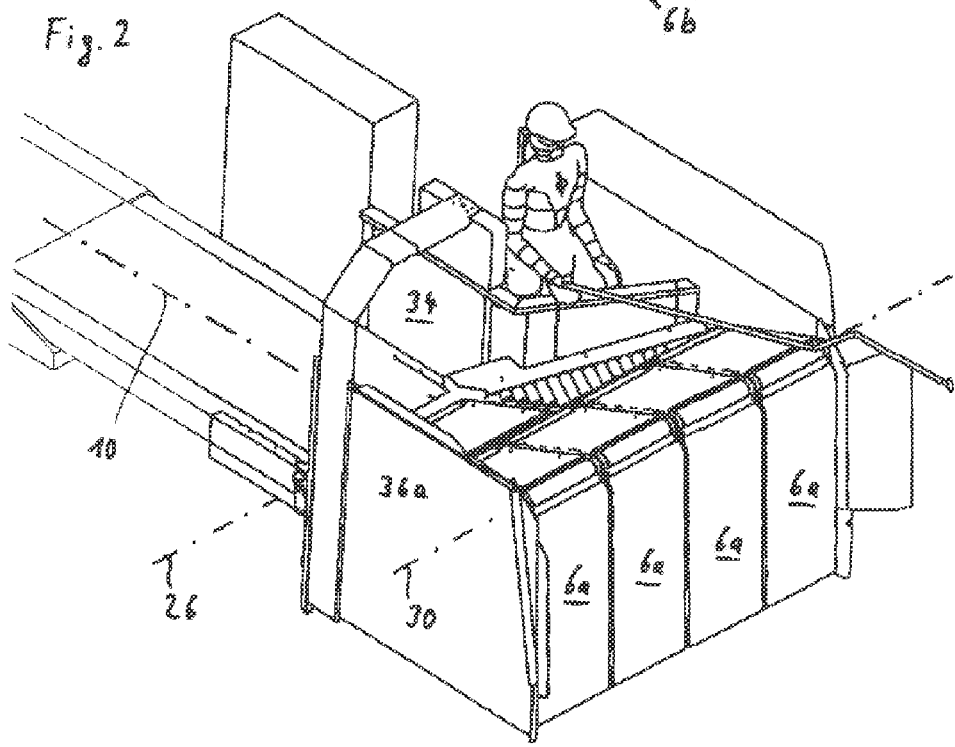
Figure 5:
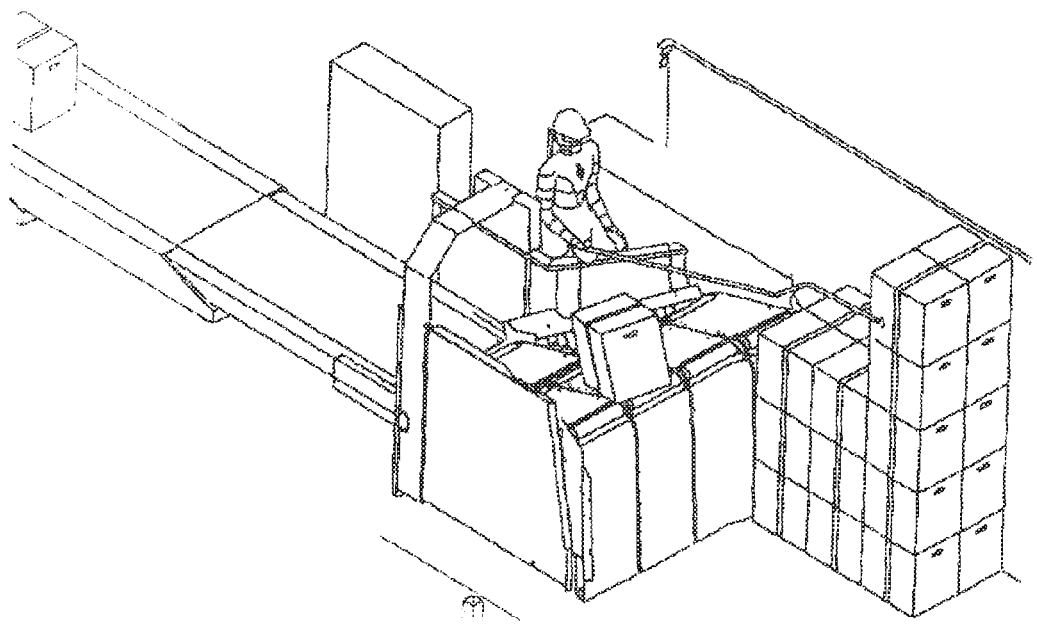
Figure 6:
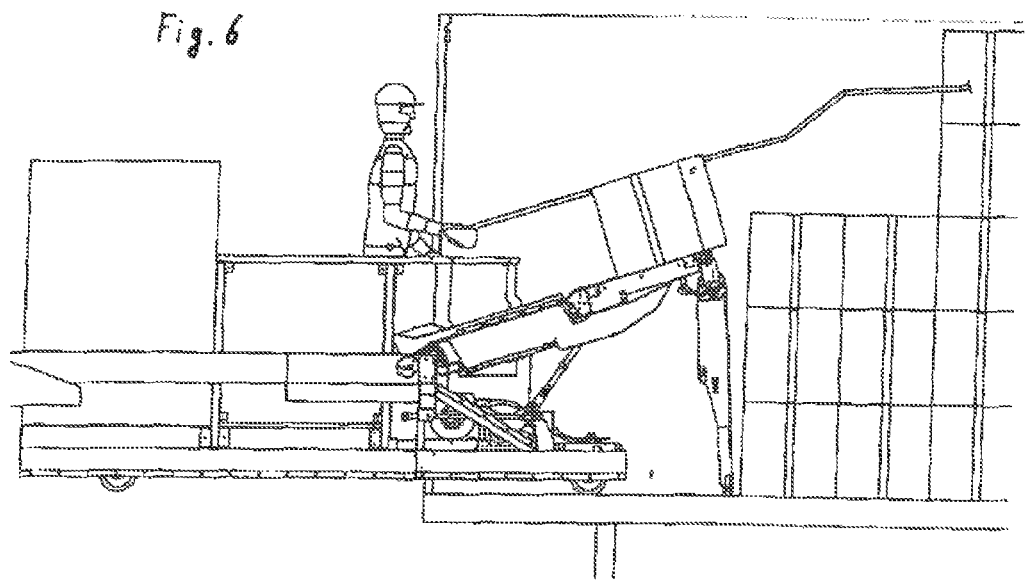
Figure 9:
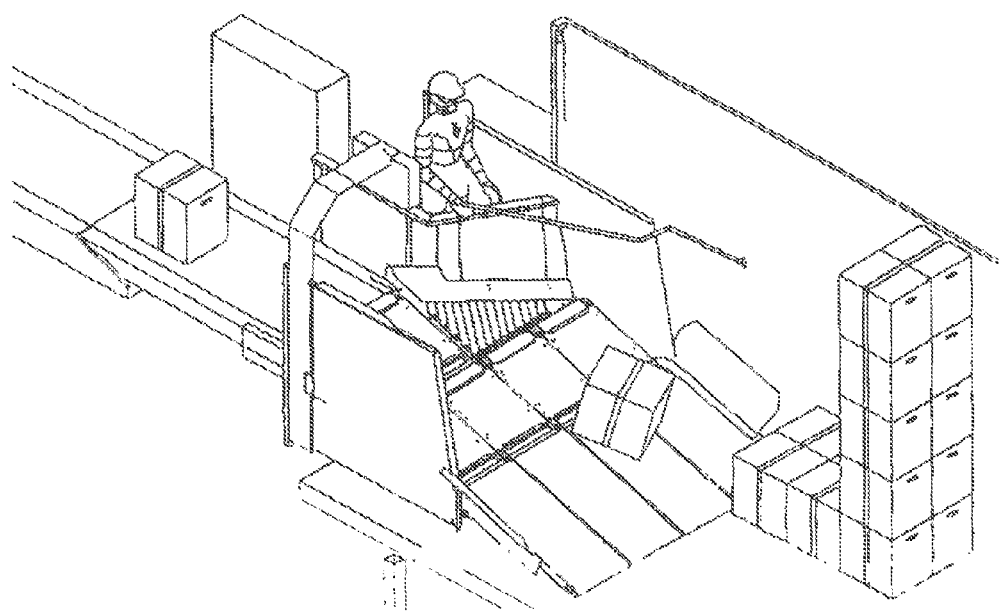
Figure 10:
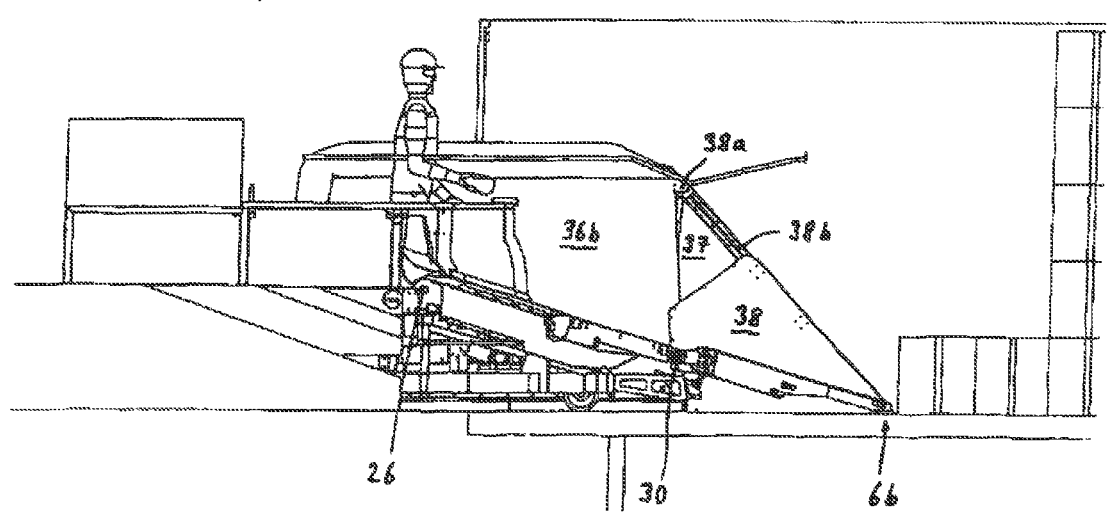
Figure 13:
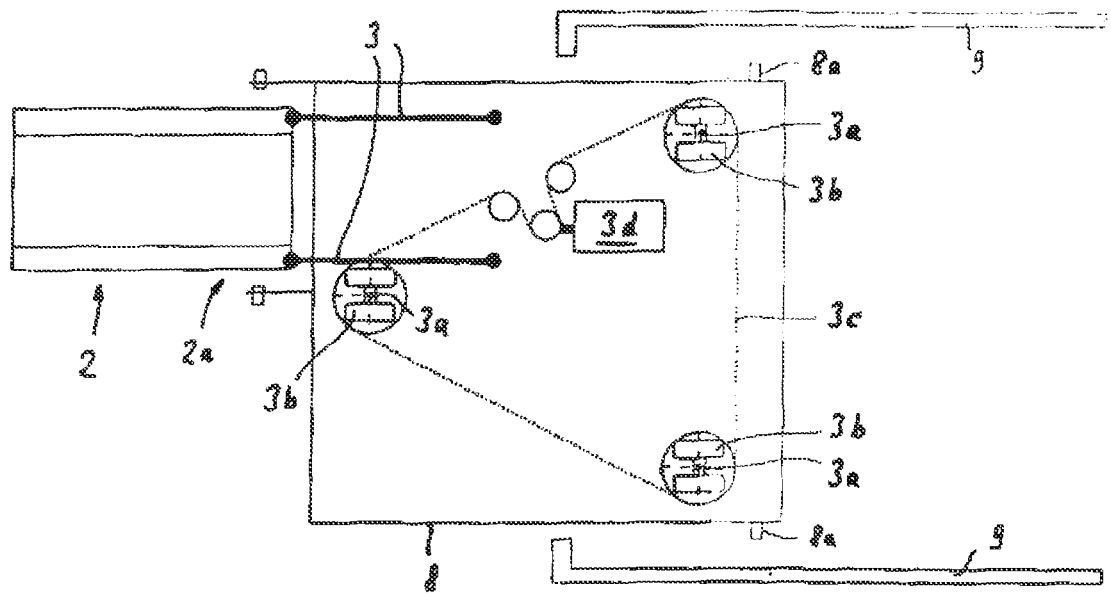
Figure 14:
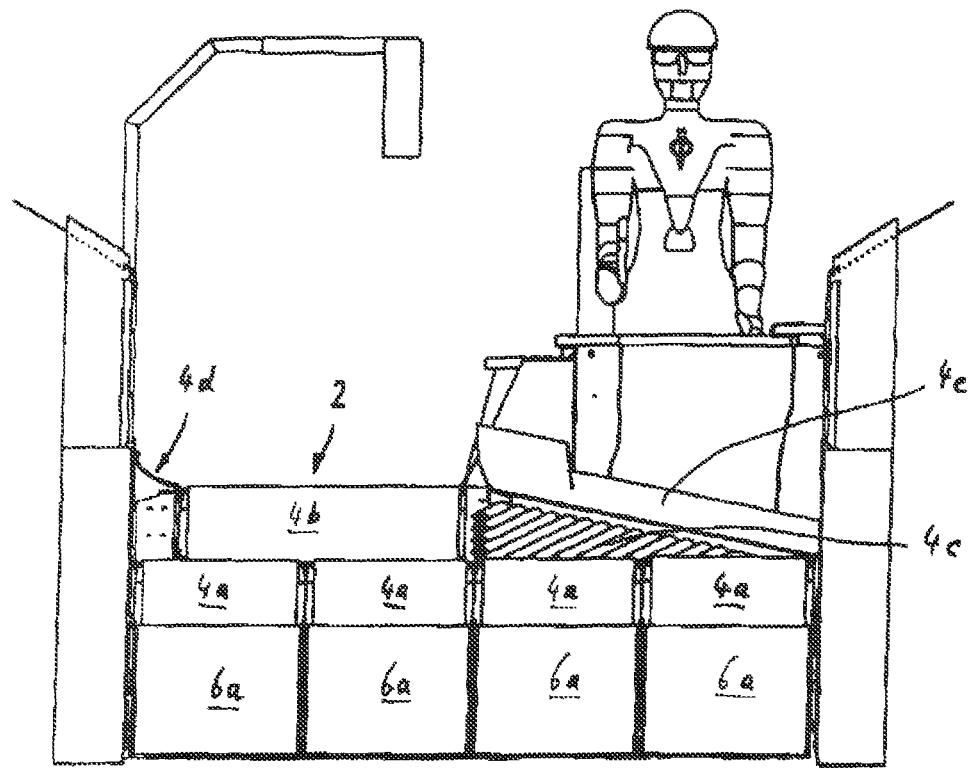

The invention will now be explained by describing a worked embodiment of the apparatus and process, reference being made to a drawing, in which FIG. 1 shows a schematic perspective view of the apparatus of the invention, wherein a receiving position is illustrated, FIG. 2 shows a perspective view of the apparatus in a transport position, FIG. 3 shows a view corresponding to FIG. 2 when driving into a loading space or container loaded with load items, FIG. 4 shows a side view, in a longitudinal section in the front area, of the apparatus in the position illustrated in FIG. 3, FIG. 5 shows a perspective view of the apparatus in a first upper unloading position, FIG. 6 shows a side view, in a longitudinal section in the front area, of the apparatus in the position illustrated in FIG. 5, FIG. 7 shows a perspective view of the apparatus in a second upper or middle unloading position, FIG. 8 shows a side view, in a longitudinal section in the front area, of the apparatus in the position shown in FIG. 7, FIG. 9 shows a perspective view of the apparatus in a lower unloading position, FIG. 10 shows a side view, in a longitudinal section in the front area, of the apparatus in a position in accordance with FIG. 9, FIG. 11 shows an enlarged schematic side view of the receiving end of the receiving conveyor in the lower unloading position, FIG. 12 shows a schematic plan view of the apparatus with the head end of the removal conveyor, FIG. 13 shows a schematic plan view of the travelling unit, and FIG. 14 shows a view of the apparatus from the front.

FIGS. 2 to 4 show the apparatus in a transport position, in which the apparatus has been moved into a compact position in which the receiving conveyor 6 hangs down freely on the second swivelling axis 30, while FIG. 1 shows the apparatus in a lower unloading position.

The apparatus comprises a removal conveyor 2, a transfer conveyor 4 and a receiving conveyor 6, which are disposed so as to abut each other directly. Any spaces or gaps between adjacent conveyors are at least smaller than a smallest dimension (thickness, width, height, diameter etc.) of the load items to be unloaded, e.g. smaller than 5 cm, 3 cm, 2 cm or 1 cm. The conveyors may be disposed on a common machine frame such that they are firmly connected together, or they may be arranged independently of one another as individual conveyors, whose position can be changed in accordance with the invention. In the context of the present description, the receiving and transfer conveyors are disposed as a unit on a common frame, on a travelling unit 8 which allows the conveyors 2, 4 and 6 to be moved along and transversely to a longitudinal direction 10 which is identical to a conveying direction 12 of the conveyors.

FIG. 12 shows a schematic plan view of a head end 2a of the removal conveyor 2 of the apparatus, and FIG. 13 shows a plan view of the travelling unit 8 and its connection to the head end 2a of the removal conveyor 2. The removal conveyor 2 and travelling unit 8 are connected together via two coupling rods 3, which permit a certain relative mobility in the sense of a tolerance to compensate for uneven ground between the removal conveyor 2 and the travelling unit 8. On its underside, the travelling unit 8 has three steering rollers 3b each steerable about a vertical steering axis 3a, at least one of which is driven by a motor so that the travelling unit 8 can be driven forwards, backwards or diagonally. The steering axes 3a are preferably disposed at corners of an isosceles or equilateral triangle, the steering rollers 3b being coupled together in an identical steering position via a chain drive 3c, which is motor-driven by a steering drive 3d, and are in this way synchronised in their steering position. This ensures that during translational movements, the travelling unit 8 is not rotated about a vertical axis, but always maintains its orientation that can be seen in FIG. 13 and its alignment in the longitudinal direction 10. Two lateral distance sensors 8a help the positioning when the apparatus is being driven into the loading space between lateral walls 9.

The removal conveyor 2 is configured as a telescope conveyor, wherein only a head end 2a and an adjoining initial portion of the removal conveyor 2 are shown, but not a delivery end opposite the head end 2a. In the case of a delivery end fixed in a stationary position, the entire part of the apparatus illustrated in FIG. 1 can be moved back and forth on the car 8 in the longitudinal direction 10 without impairing the removal of load items. In a preferred application for emptying a container, trailer or swap body laden with loose load items, for example laden with packages and parcels, the head end 2a of the removal conveyor 2 can in this way be advanced opposite to the conveying direction 12, entraining the transfer conveyor 4 and the receiving conveyor 6 in the process, by moving the travelling unit 8 until the receiving conveyor 6 is standing directly in front of or is already in contact with stacked or piled load items.

The receiving conveyor may have a plurality of receiving conveying members, arranged parallel, side by side, which can be driven and reversed independently of one another, also at different speeds, and can be telescoped or adjusted passively in length (indicated by the double-ended arrows in FIG. 1). The transfer conveyor may have a plurality of transfer conveying members arranged parallel, side by side, which can be driven and reversed independently of one another, also at different speeds (indicated by the double-ended arrows in FIG. 1).

In the embodiment illustrated, the transfer conveyor 4 is multiply subdivided and consists of four transfer conveying members disposed side by side in the form of belt conveyors with conveyor belts 4a, a further belt conveyor downstream with a conveyor belt 4b and a roller path 4c arranged to the side, which forms a substantially triangular or trapezoidal conveying surface. The roller path 4c has rollers arranged diagonally to the longitudinal direction 10 in order to create a conveying component directed to a vertical longitudinal central plane of the removal conveyor 2. Lateral deflector plates 4d, e (FIGS. 1, 14) form a transition between moving conveying members of the transfer conveyor and side walls 36, which are described further down. The transfer conveyor 4 thus has a conveying surface which extends between a front takeover end 16, a rear handover end 18 and two lateral edges. It goes without saying that the transfer conveyor 4 is not limited to the combination of conveyor belts and roller paths illustrated, but could be realised completely or partly with conveyor belts, link belts, roller paths or other conveying constructions. The lateral deflector plates 4d, e may be configured transversely to the conveying direction 12 and sloping upwards in order to achieve a desired effect of guiding load items towards the removal conveyor 2. A rectangular part 4b, 4a, 4a of the conveying surface runs in an extension of the removal conveyor 2 (FIG. 12), and a trapezoidal part 4c, 4a, 4a is located beside it to the right, seen in the conveying direction.

The removal conveyor 2 preferably extends horizontally, a conveying surface of the removal conveyor at the head end 2a of the removal conveyor 2 being arranged at a predetermined height H above a floor 22 on which the travelling unit 8 rests and travels. The height H may be between 30 cm and 1 m for example. In principle, it is desirable that the height above the floor should not be too great so that, in the lower unloading position, the receiving and takeover conveyors 4, 6 are not at too great an upward incline to bridge the difference in height between the floor and the removal conveyor. An upward incline between the receiving conveyor and the transfer conveyor of between 10° and 30° to the horizontal is advantageous.

In the transport position illustrated in FIGS. 2 to 4 and in the unloading positions illustrated in FIGS. 5 to 8, the receiving conveyor 6 is arranged vertically in each case and extends vertically downwards from the takeover end 16 of the takeover conveyor 4 to just above the floor 22, for example 1 mm to 10 mm above it (unloading position), or ends at a greater distance, for example 5 to 15 cm, above the floor (transport position). In the embodiment illustrated, the receiving conveyor 6 also consists of a row of individual receiving conveying members or conveyor belts 6a in the form of belt conveyors with conveyor belts 6g (FIG. 11) arranged side by side, wherein each conveyor belt 6a is passively adjustable in length. With appropriate pressure against a front receiving end 6b of the receiving conveyor 6 or the individual conveyor belts 6a, the conveyor belt 6a' shortens against the pressure of a restoring spring and lengthens back to its initial length when the force is removed.

FIGS. 2 to 4 and FIGS. 9, 10 show an initial length L of the receiving conveying members 6a and of the receiving conveyor 6 in contrast to the shortened or minimal lengths of the receiving conveying members 6a according to FIGS.

7, 8. The characteristics of passive telescoping can be adjusted such that the receiving conveyor 6 can already be shortened in response to a slight force acting in the conveying direction 12, or such that the receiving conveyor 6 can only be shortened as of a certain minimum force, the strength of which can be set as a threshold.

The transfer conveyor 4 is mounted so as to be pivotable in height about a first swivelling axis 26, which is disposed horizontally and transversely to the conveying direction 12 in a fixed position adjacent to the head end 2a of the removal conveyor 2, and is thus adjustable in height in its front portion, especially with its takeover end 16. The receiving conveyor 6 is pivotable in height about a second swivelling axis 30, which is disposed horizontally and transversely to the conveying direction 12 adjacent to the takeover end 16 of the transfer conveyor 4, and is thus adjustable in height in its receiving end 6b, relative to the takeover end, so that there are a wide range of adjustment possibilities for the transfer and receiving conveyors 4, 6. In the context of the invention, it is contemplated that the receiving end 6b of the receiving conveyor 6 is always located on the floor 22 or directly above the floor 22.

When the transfer conveyor 4 is configured as a belt or roller conveyor, the first swivelling axis 26 preferably runs through a drive or return roller of the transfer conveyor 4 located at the handover end 18, or through an adjacent return roller of the removal conveyor 2. In a similar manner, when the receiving conveyor is configured as a belt or roller conveyor, the second swivelling axis 30 preferably runs through a drive or return roller of the receiving conveyor 6 located at the delivery end 6c, or through a drive or return roller located at the takeover end 16 of the transfer conveyor 4.

The conveying surface of the transfer conveyor 4 in the area of the handover end 18 is preferably a certain degree above an adjacent end of the conveying surface of the removal conveyor 2 in order to prevent small load items from becoming trapped in the transition region between the transfer and removal conveyors. This can be achieved by, for example, having a drive or return roller disposed at the handover end 18 of the transfer conveyor 4 at the same height as, or higher than, a drive or return roller located at the head end 2a of the removal conveyor 2, wherein the first swivelling axis 26 runs through the drive or return roller at the handover end 18. A corresponding arrangement is preferably provided between the receiving and transfer conveyors, it being convenient that a drive or return roller located in the region of the delivery end 6c through which the second swivelling axis 30 runs is disposed at the same height as, or higher than, a drive or return roller located at the takeover end 16 of the transfer conveyor 4.

Disposed next to the removal conveyor 2 are side walls 34 (and 35, indicated by dashed lines in FIGS. 1, 12), which extend over at least part of the length of the removal conveyor 2 in the region of its head end 2a, especially beginning at the head end 2a. Further side walls 36a, b are provided laterally, next to the transfer conveyor 4. The side walls 34, 35, 36a, b are disposed closely adjacent to the respective conveyors and prevent individual load items from falling down beside the conveyors. The side wall 36b, which runs towards the middle or inwards facilitates the transport of load items on the removal conveyor 2 when they are located off-centre on the transfer conveyor 4 or the receiving conveyor 6, in that the load items are given a conveying component directed towards the longitudinal central plane of the removal conveyor.

Extendable side walls 37, 38 extend next to the receiving conveyor 6. FIGS. 1 and 10 illustrate one embodiment. The side walls 38 are pivotably hinged at the upper corner 38a to the side walls 36a, b disposed next to the transfer conveyor 4 and may be connected in an articulated manner to the front end or receiving end 6b by means of a linear guide 38b which can be telescoped, so that they are extended automatically when the receiving conveyor 6 is moved from an upper to the lower unloading position and vice versa.

To the side of the head end 2a of the removal conveyor 2 and/or next to a region of the transfer conveyor 4 adjacent to it there is a horizontal working platform 40, which can be firmly mounted at a predetermined height, such as at a height of 0.5 H, above the floor 22 or it may be adjustable in height, wherein an operator 42 standing on the working platform 40 can adjust the height manually. Alternatively, the height adjustment can be performed automatically in connection with the selection or extension of a particular unloading or receiving position by means of a control system configured accordingly. In order to protect the operator 42, the side wall 36b can be of a predetermined height in the region of the working platform 40 and enclose a protected working area 44 in a curved or angled path. A door 45 enables the operator to enter the receiving or transfer conveyor when it is standing still, for example to remove any conveying items that are not capable of being conveyed.

The side walls 36a disposed opposite the working platform 40 next to the transfer conveyor (to the left when seen in the conveying direction 12 in the example illustrated) are either disposed parallel to the longitudinal direction 10 or at a small angle of about 5° to 20°, preferably no more than 10°, their spacing increasing from a longitudinal central plane of the removal conveyor 2 counter to the conveying direction. The side walls 36b disposed on the side of the working platform 40 (disposed to the right when seen in the conveying direction in the example illustrated) run at an angle of approx. 30° to 60° to the longitudinal direction 10 in a region adjacent to the working platform 40, and virtually parallel to the longitudinal direction in a region located between the working platform and the receiving conveyor next to the transfer conveyor 4.

Brushes or profile members of elastic material or gap-bridging means acting in a similar way may be attached to the side walls 36a, b or 38 and/or laterally of the receiving conveyor 6 to compensate for dimensional tolerances, such as uneven surfaces of side walls of a loading space to be unloaded, so that no load items fall down to the side or slip between the side walls and the wall of the loading space or in the event of a crooked position of the load carrier. As FIG. 4 shows, at the front and optionally also at the sides, deflector members in the form of brushes 46 or profile members may be disposed on the car 8, so that any load items that may happen to be lying on the floor are not run over.

For use, the apparatus is first arranged in the first upper unloading position illustrated in FIGS. 4 to 6, in the second upper unloading position illustrated in FIGS. 7, 8 and then in the lower unloading position illustrated in FIGS. 1, 9 and 10, in which load items can be picked up from the floor 22 and transported to the removal conveyor 2 by means of the receiving and transfer conveyors 6, 4. Because the transfer conveyor 4 can be swivelled about the first swivelling axis 26 and the receiving conveyor 6 can be swivelled about the second swivelling axis 30, differently inclined lower unloading positions are possible, apart from the "straight" and preferred position illustrated in FIGS. 1, 9 and 10, in which the receiving conveyor 6 is at the same angle of inclination of about 10° to 30° to the horizontal as the transfer conveyor 4, so that the two conveyors are substantially disposed in a common plane. As an alternative to this position, the receiving conveyor 6 may be disposed more steeply than the transfer conveyor 4, such as at 20° to 40°, which results in an intermediate position between the unloading position according to FIGS. 7, 8 and the one according to FIG. 1, or less steeply than the latter, such as at 0° to 20°, so that the second swivelling axis 30 or a transition region which comprises the delivery end 6c of the receiving conveyor 6 and the takeover end 16 of the transfer conveyor 4 are disposed at a lower height above the floor 22 than in the position illustrated in FIG. 1. A maximum position is reached when the second swivelling axis 30 is located directly above the floor 22 and the receiving conveyor 6 is arranged horizontally to the floor. A lower unloading position like this can be advantageous in order to pick up load items lying on the floor.

In order to unload load items stacked on a floor of a loading space, such as parcels and packages from a container or a swap body, the apparatus is first driven in the transport position (FIGS. 2 to 4) with the aid of the car 8 close up to a loading opening of the loading space on its floor 22. Whether the apparatus is moved into an upper unloading position corresponding to the first or second upper unloading positions or into a lower unloading position depends essentially on whether the load items in the container are stacked higher than a certain height or not, and on the nature and sensitivity of the load items, i.e. on whether they can fall onto the receiving conveyor from the stacked height without the risk of damage when the conveyor is in a receiving position, or whether there is a risk of damage and it is preferable only to allow the load items to drop onto the transfer conveyor which is in the first or second upper unloading position at a substantially greater height than the receiving conveyor in the lower unloading position. In the case of load items with a certain sensitivity, such as postal parcels where no damage is to be expected if they drop from a height of up to 1 m, it is possible to work in a lower unloading position, provided that the load items are not stacked substantially higher than 1 m. In the case of greater stacking heights, it is necessary to work first in an upper unloading position, such as in the first or second upper unloading position, and then in the lower unloading position.

As a rule, in a first step, work is first performed in the first upper unloading position, in which the operator 42 uses an auxiliary tool 50 to move load items which do not drop onto the transfer conveyor 4 of their own accord from their stacked position onto the transfer conveyor 4. The auxiliary tool 50 may be a tube or rod of aluminium, wood or plastic, e.g. carbon, which has a gripping tool 52 attached to it at the end facing away from the operator, which in the simplest case may be a hook or a plate arranged vertically to the tube or rod. Alternatively or in addition, a suction or needle gripper in a single or multiple configuration may be provided as the gripping tool. In addition, depending on the specific situation, it is possible for the operator to select one of many different auxiliary tools and thus a suitable gripping tool. Depending on the situation, the operator can either grasp behind a load item or grasp it from the front with a gripper and pull it out of the stacked position or knock it over, whereupon the load item drops onto the transfer conveyor 4 substantially in a free fall. From there, the load item is transported by the transfer conveyor onto the removal conveyor 2 and from there delivered to a destination point arranged in advance. When the receiving conveyor 6 is standing vertically, it in effect merely ensures in this unloading position that no load items slip beneath the receiving conveyor.

Following unloading activity in the first upper unloading position, it is possible to continue unloading in a second upper or middle unloading position, which is illustrated in FIGS. 7 and 8. Compared to the first upper unloading position according to FIGS. 4 to 6, the transfer conveyor is swivelled down by a certain angle about the first swivelling axis 16, the receiving conveyor 6 remaining aligned vertically and standing on the floor 22, its length now being shortened to the maximum extent. In the second upper unloading position, the receiving conveyor 4 can have a slight inclination, such as no more than 10°, 20° or 30° to the horizontal, or may be aligned horizontally.

In a second step, the apparatus is moved to a suitable lower unloading position, i.e. the transfer conveyor 4 is swivelled downwards about the first swivelling axis 26, and the receiving conveyor 6 is simultaneously or previously swivelled in the opposite swivelling direction, either passively solely by the transfer conveyor or actively by means of a corresponding swivelling drive, until a desired angular position of the two conveyors is reached, wherein the receiving end 6b of the receiving conveyor 6 is disposed on or directly above the floor 22. A number of different lower receiving positions are also possible. The receiving end of the receiving conveyor is preferably located during the entire adjustment process on or directly above the floor, so that no load items can slip beneath the receiving conveyor. During or before the second step, the apparatus can first be moved in the conveying direction away from the load items to be picked up, in order to enable or support the adjustment movement of the receiving conveyor, and then moved forwards towards the load items to be unloaded, so that the receiving end of the receiving conveyor remains in or comes into contact with the load items to be picked up. It is advantageous if, during the adjustment process and/or while the apparatus is being driven towards the load items to be unloaded, the receiving conveyor already executes a conveying movement in the conveying direction 12 so that, as far as possible, a load item that comes into contact with the receiving end immediately begins to be picked up, such as by being lifted on one side, so that as the apparatus continues to advance towards the load items to be unloaded, in many cases load items lying on the floor are already picked up automatically.

In the event of malfunction situations, in which load items are located in front of the receiving conveyor or to the side between the receiving conveyor or transfer conveyor and a wall, the operator will first attempt to pull the load items onto the receiving conveyor with the aid of the auxiliary tool. During this process, the conveyors remain in operation.

Apart from that, the operator can briefly drive individually selected or all the conveyor belts or roller paths in a direction opposite to the conveying direction 12, i.e. reverse them, in order to release a jam.

In the event that load items become jammed in the area of the head end of the removal conveyor, the operator can reach over the side wall either by hand or with an auxiliary instrument, in order to eliminate the malfunction, or he can step on the transfer or removal conveyor. For this purpose, the door 45 may possess a safety device which either switches off the receiving and transfer conveyors when the door is opened or enables the door to be opened only when the conveyors are switched off.

FIG. 11 shows an enlarged detailed lateral view of the receiving end 6b of the receiving conveyor 6, where a supporting roller 6d can be seen, which is mounted with a horizontal pivot axis 6e on the receiving conveyor 6 and which supports the receiving conveyor 6 on the floor 22 so that it can be easily displaced. It can be seen that as of a certain angle of inclination of the receiving conveyor 6, when it is made steeper, the supporting roller 6d lifts off the floor 22, as a result of which the receiving end 6b of the receiving conveyor 6 then first rests on the floor 22 on supporting members 6f. If the receiving conveyor or conveyors 6 is/are placed at a steeper angle by swivelling, the supporting members 6f also lose contact with the floor, and the conveyor belt 6g of the receiving conveyor comes into contact with the floor before the receiving conveyor is lifted off the floor completely.

List of reference numerals 2 removal conveyor
2a head end
3 coupling rod
3a steering axis
3b steering roller
3c chain drive
3d steering drive
4 transfer conveyor
4a conveyor belt
4b further conveyor belt
4c roller path
4d, e deflector plate
6 receiving conveyor
6a, 6a' conveyor belt (receiving conveying member)
6b receiving end
6c delivery end
6d supporting roller
6e pivot axis
6f supporting member
6g conveyor belt
8 car (travelling unit)
8a distance sensor
9 lateral loading space wall
10 longitudinal direction
12 conveying direction
16 takeover end
18 handover end
22 floor
26 first swivelling axis
30 second swivelling axis
34, 35, 36a, b, 37, 38 side wall
38a corner (hinge point)
38b linear guide
40 working platform
42 operator
44 working area
45 door
46 brush (deflector member)
50 auxiliary tool
52 gripping tool
H height (of 2)
L length (of 6)

The invention claimed is:

1. An apparatus for unloading load items stacked, tipped or loosely piled on a floor of a loading space, comprising a receiving conveyor having a freely projecting receiving end and a rear delivery end, a removal conveyor and a transfer conveyor arranged therebetween, which has a front takeover end adjoining the delivery end of the receiving conveyor and a rear handover end adjoining a head end of the removal conveyor, wherein the transfer conveyor is mounted so as to be pivotable in height about a horizontal first swivelling axis arranged transversely to its conveying direction at the handover end adjacent to the head end of the removal conveyor, and the receiving conveyor is mounted so as to be pivotable in height about a horizontal second swivelling axis arranged transversely to its conveying direction at the delivery end adjacent to the transfer end of the transfer conveyor, characterised in that the receiving conveyor and the transfer conveyor can be moved, by being swivelled about the first and second swivelling axes, into at least one upper unloading position, in which a conveying surface of the transfer conveyor is predominantly horizontal at an angle of no more than 10°, 20°, 30°, or 40° to the horizontal before the first swivelling axis, a conveying surface of the receiving conveyor is predominantly vertical at an angle of no more than 10°, 20°, 30°, or 40° to the vertical below the second swivelling axis and the receiving end of the receiving conveyor is on or directly above the floor of the loading space, or into at least one lower unloading position, in which the conveying surfaces of the receiving conveyor and of the transfer conveyor are predominantly horizontal at an angle of no more than 10°, 20°, 30°, or 40° to the horizontal and the receiving end of the receiving conveyor is located on or directly above the floor of the loading space, wherein the freely projecting receiving end is a terminal end.

2. The apparatus as claimed in claim 1, characterised in that the removal conveyor is disposed at a predetermined height above the floor, which corresponds to half the length of the receiving conveyor.

3. The apparatus as claimed in claim 1, characterised in that the removal conveyor can be telescoped.

4. The apparatus as claimed in claim 1, characterised in that the receiving conveyor can be telescoped or passively adjusted in length.

5. The apparatus as claimed in claim 1, characterised in that the transfer conveyor and the receiving conveyor are disposed on a common machine frame, which can be moved in a controlled manner on a travelling unit.

6. The apparatus as claimed in claim 1, characterised in that the transfer conveyor is wider at the takeover end than at the handover end and is equipped with at least one lateral conveyor member, which is in particular rectangular, triangular or trapezoidal and tapers towards the handover end.

7. The apparatus as claimed in claim 1, characterised in that the receiving conveyor comprises a plurality of juxtaposed receiving conveying members.

8. The apparatus as claimed in claim 7, wherein each respective receiving conveying member is configured to be driven and reversed independently of the other receiving conveying member.

9. The apparatus as claimed in claim 1, characterised in that the transfer conveyor has a plurality of juxtaposed transfer conveying members.

10. The apparatus as claimed in claim 9, wherein each respective transfer conveying member is configured to be driven and reversed independently of the other transfer conveying member.

11. The apparatus as claimed in claim 1, characterised in that side walls are disposed adjacent to the removal conveyor and/or adjacent to the transfer conveyor, which walls run toward the middle or inwards of the respective conveyor.

12. The apparatus as claimed in claim 11, characterised in that a working platform for an operator is provided outside and adjacent to a side wall.

13. A process for unloading load items stacked, tipped or loosely piled on the floor of a loading space using an apparatus comprising:

a receiving conveyor having a freely projecting receiving end and a rear delivery end, a removal conveyor and a transfer conveyor arranged therebetween, which has a front takeover end adjoining the delivery end of the receiving conveyor and a rear handover end adjoining a head end of the removal conveyor, wherein the transfer conveyor is mounted so as to be pivotable in height about a horizontal first swivelling axis arranged transversely to its conveying direction at the handover end adjacent to the head end of the removal conveyor, and the receiving conveyor is mounted so as to be pivotable in height about a horizontal second swivelling axis arranged transversely to its conveying direction at the delivery end adjacent to the takeover end of the transfer conveyor, characterised in that the receiving conveyor and the transfer conveyor can be moved, by being swivelled about the first and second swivelling axes, into at least one upper unloading position, in which a conveying surface of the transfer conveyor is predominantly horizontal at an angle of no more than 10°, 20°, 30°, or 40° to the horizontal before the first swivelling axis, a conveying surface of the receiving conveyor is predominantly vertical at an angle of no more than 10°, 20°, 30°, or 40° to the vertical below the second swivelling axis and the receiving end of the receiving conveyor is on or directly above the floor of the loading space, or into at least one lower unloading position, in which the conveying surfaces of the receiving conveyor and of the transfer conveyor are predominantly horizontal at an angle of no more than 10°, 20°, 30°, or 40° to the horizontal and the receiving end of the receiving conveyor is located on or directly above the floor of the loading space, wherein the freely projecting receiving end is a terminal end;

wherein in a first step, the apparatus is moved to an upper unloading position, and a load item located above a predetermined unloading height or above the transfer conveyor is transferred directly to the transfer conveyor, and in a second step, the apparatus is moved to a lower unloading position, and a load item located below the predetermined unloading height or on the floor of the loading space is transferred to the receiving conveyor.

14. The process as claimed in claim 13, characterised in that in the first step, the apparatus is moved successively or alternately into a first upper unloading position and into a second upper unloading position, wherein the takeover end in the first upper unloading position is at a greater height above the floor than in the second upper unloading position.

15. The process as claimed in claim 13, characterised in that transferring at least those load items located above the transfer conveyor onto the transfer conveyor is supported manually by operator , especially by means of an auxiliary tool.

16. The process as claimed in claim 13, characterised in that before or during the first step, the apparatus is advanced as far as possible into the loading space, until the receiving conveyor, which is in particular in a vertical position, comes to rest against load items.

17. The process as claimed in claim 13, characterised in that the first and second steps are repeated alternately, until the loading space has been completely unloaded.

18. The process as claimed in claim 3, characterised in that any load item lying on the floor of the loading space is picked up by moving the apparatus while it is in a lower unloading position in a direction opposite to the conveying direction.

* * * * *